United States Patent [19]

Morreale

[11] 4,217,690
[45] Aug. 19, 1980

[54] METHOD OF ASSEMBLY FOR ELECTRIC MOTOR STATORS

[75] Inventor: Anthony P. Morreale, Whittier, Calif.
[73] Assignee: Rapidsyn Co., Santa Fe, Calif.
[21] Appl. No.: 941,026
[22] Filed: Sep. 11, 1978

Related U.S. Application Data

[63] Continuation-in-part of Ser. No. 918,395, Jun. 23, 1978, abandoned.

[51] Int. Cl.² ............... H02K 15/02; H02K 15/10
[52] U.S. Cl. ............................ 29/596; 310/42; 310/215; 310/217
[58] Field of Search ............ 29/596, 598; 310/215, 310/217, 194, 42

[56] References Cited

U.S. PATENT DOCUMENTS

| | | | |
|---|---|---|---|
| 2,473,332 | 6/1949 | England | 310/215 X |
| 2,999,176 | 9/1961 | Lindstrom et al. | 310/194 X |

*Primary Examiner*—Carl E. Hall
*Attorney, Agent, or Firm*—Christie, Parker & Hale

[57] ABSTRACT

A stator assembly in which a stack of stator laminations form a stator core. The laminations are shaped to form a plurality of poles projecting radially inwardly with arcuate undercut slots between the poles. The laminations are held together by a plurality of molded tubular insulator members, each comprising male and female sections inserted from opposite directions into the slots and joining together telescopically within the slots. Each end of the tubular member sections have integral flanges which engage the ends of the poles between the slots. The tubular members are split lengthwise and compressed to insert them in the slots. Once inserted, the tubular members expand within the slots to grip the edges of the laminations and hold the stack together and in alignment. The stator coils extend through the tubular members within the slots, the members providing insulation between the coils and the core.

4 Claims, 9 Drawing Figures

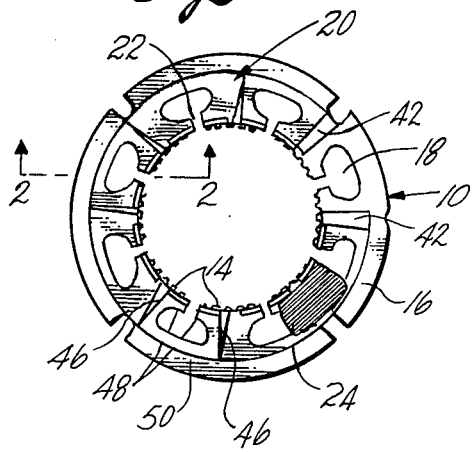
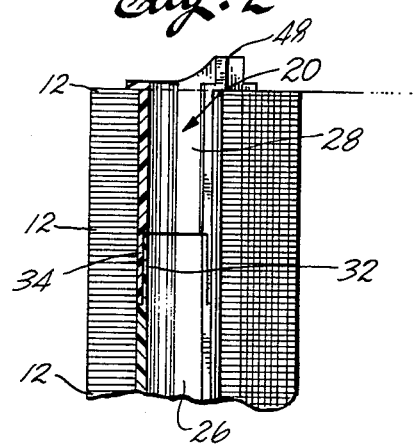
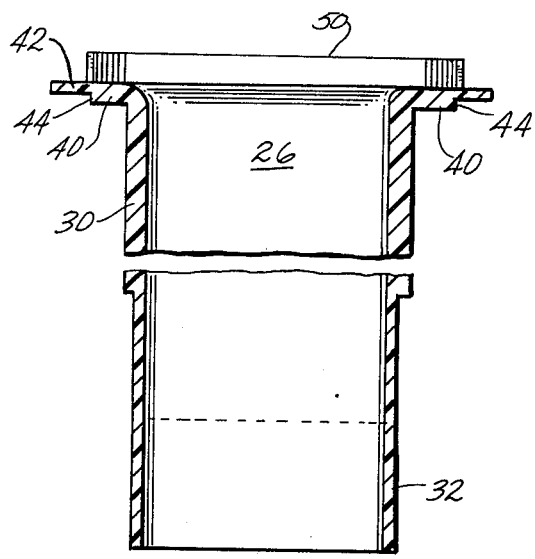
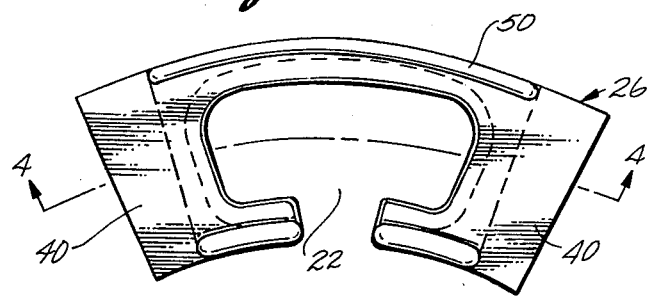

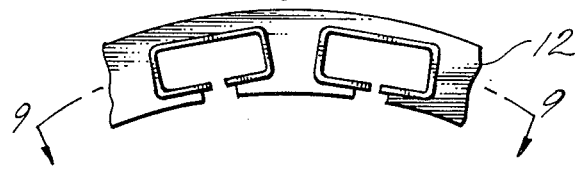
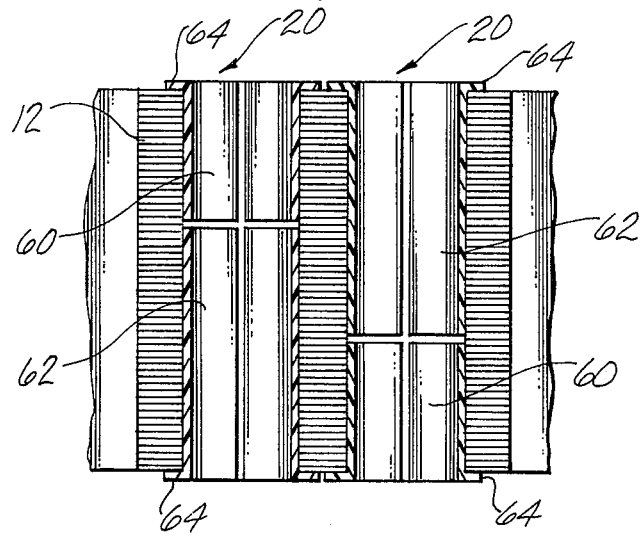

METHOD OF ASSEMBLY FOR ELECTRIC MOTOR STATORS

CROSS-REFERENCE TO RELATED APPLICATION

This application is a continuation-in-part of application Ser. No. 918,395, filed June 23, 1978, now abandoned.

FIELD OF THE INVENTION

This invention relates to the construction and assembly of motor stators, and more particularly, stators having laminated cores with salient poles.

BACKGROUND OF THE INVENTION

Small AC motors using salient poles to facilitate machine winding are well know, particularly in the construction of synchronous or stepping type motors. The stator cores are generally constructed of laminations stamped from magnetic steel sheet, a stack of the laminations then being riveted, bonded, or welded into a unitary core. Wire coils are then wound on the individual poles by passing the turns of the coils through the slots between the poles. Some type of insulation is provided between the core and the wire coils to electrically isolate the windings from the steel core. Insulation has been generally provided by wrapping tape around the poles before winding the coils on the poles. Slot liners made of "fish" paper or other insulating material has also been used. However, for the smaller motors where space is at a premium, it has been the practice to coat the surfaces of the core with a fluidized insulating material. This is done by dipping the stack of laminations, after they have been joined together as a unit, into the fluidized insulating material, allowing the insulating material to cure into a solid protective layer, and then removing the insulating material from the pole faces and other surfaces of the core in which the metal of the core needs to be exposed. In addition to being a cumbersome process for applying insulation, the fluidized insulation tends to break down, particularly at the sharp edges, such as at edges of the poles where the wires of the coils pass around the end of the poles in going out one slot and into the adjacent slot. The result has been that the assembled stators frequently fail to meet high voltage electrical breakdown tests of the electrical isolation between the wire coils and the core.

SUMMARY OF THE INVENTION

The present invention is directed to an improved design and method of assembly of motor stators which eliminates the need to first join the laminations into a unitary stack, as by welding or the like, before winding of the coils on the stator core. At the same time the present invention provides greatly improved electrical isolation between the coils and the core. The present invention permits easier repair and reuse of a stator assembly when insulation breakdown does occur. The present invention reduces the cost of assembly of the stack and greatly facilitates the machine winding of the coils on the assembled stack. Thus the present invention results in greater uniformity and quality of the finished assembly.

These and other advantages of the present invention are achieved, in brief, by a stator assembly comprising a stack of stator laminations forming a plurality of poles projecting radially inwardly of the stack, the poles forming arcuate undercut slots between the poles. A plurality of molded tubular insulator members consisting of male and female sections are inserted into the slots from opposite ends of the stack and are joined in telescoping relationship within the slot. The outer ends of the sections of each of the tubular members have a pair of radially extending flanges which overlap the intermediate poles at the end of the stack, the flanges of adjacent tubular members overlapping each other to provide insulation between the ends of the coils and the ends of the poles. The tubular members are slotted lengthwise to form openings between the poles, the slotted tubular members being made of a resilient material which normally is deformed slightly to insert the tubular members into the slots. Once in the slots, the tubular members tend to expand outwardly against the surfaces of the slots to secure the tubular members tightly in the slots.

BRIEF DESCRIPTION OF THE DRAWINGS

For a more complete understanding of the invention reference should be made to the accompanying drawings, wherein:

FIG. 1 is an end view of a stator assembly with one tubular insulator member removed and with all but one coil removed;

FIG. 2 is a partial sectional view taken substantially on the line 2—2 of FIG. 1;

FIG. 3 is a detailed end view of a male section of an insulator member;

FIG. 4 is a sectional view taken substantially on the line 4—4 of FIG. 3;

FIG. 8 is a partial end view in section showing a pair of adjacent slots of a stack with a modified insulator arrangement; and FIG. 9 is a sectional view taken substantially on the line 9—9 of FIG. 8.

DETAILED DESCRIPTION

Figure 5:
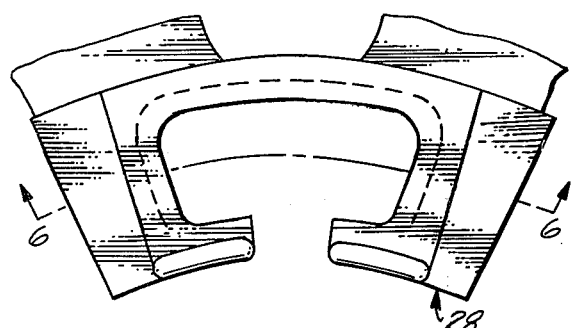
FIG. 5 is an end view of a female section of the insulator member.

Referring to FIG. 1 in detail, the numeral 10 indicates generally a motor stator assembly which includes a core 12 made up of a stack of sheet metal laminations. The individual laminations have an outline shape which includes a plurality of poles 14, typically eight in number, which project radially inwardly from a circular outer rim 16. The individual poles 14 form a cylindrical inner surface which, in the case of a stepping motor, may be notched or serrated. The individual poles 14 form a plurality of undercut slots 18 in which are inserted tubular insulator members, indicated generally at 20, and described hereafter in detail in connection with FIGS. 3–6. The insulator members 20 have an open slot 22 which is aligned with the opening between the adjacent pole faces. Wire coils are wound on each pole, as indicated at 24, by conventional coil-winding technique.

Figure 6:
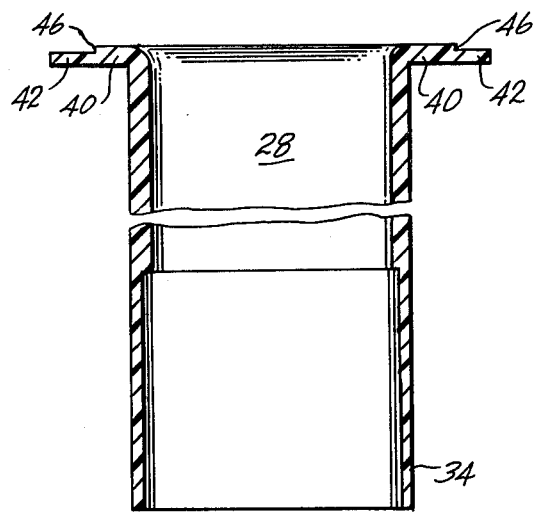
FIG. 6 is a sectional view taken on the line 6—6 of FIG. 5.

Each tubular insulator member 20 consists of two molded plastic sections, a male section 26, shown in FIGS. 3 and 4, and a female section 28, shown in FIGS. 5 and 6. Both the male amd female sections comprise an elongated tubular portion 30 having an outer surface which has the same cross-sectional shape as the slots 18 between adjacent poles of the laminated core. The tubular portion has a slot 22 running lengthwise which forms a longitudinal opening on the inner wall of the tubular member which has a two-fold function. First, the slotted opening provides access for the coil winding process. Secondly, the slot allows the tubular member to be compressed during insertion into the slots 18 of the stator core. The tubular members are molded of a plastic material having a resilience such that by making the tubular members slightly larger than the slots 18, the tubular members tend to expand after being inserted in the slots to securely grip the edges of the core laminations.

The male and female sections of the tubular member are inserted from opposite ends of the stack and engage each other in telescoping relationship in the center of the stack, as best seen in FIG. 2. The telescoping ends of the two sections, indicated at 32 for the male section and 34 for the female section of the tubular insulator member, are made sufficiently long to permit adjustment in the overall length of the tubular member. This permits the same molded sections to be used with stacks of varying axial length.

The outer ends of the tubular insulator member sections are formed with arcuate flanges 40. The arcuate flanges for the male sections have a thinner outer tab 42 formed with an offset lower surface and shoulder 44. The arcuate flanges 40 of the female sections terminate in an outer tab 42 with the top surface being offset to form a shoulder 46. As best seen in FIG. 1, the arcuate flanges 40 overlie the ends of the poles 14. By alternately inserting male and female sections in adjacent slots of the core, the offset tabs 42 of the adjacent sections overlap each other to completely insulate the end surfaces of the stack between adjacent poles.

In addition, the outer ends of the tubular member sections are provided with an integrally molded inner ridge 48 which restrains the outer ends of the wire coils 24. An outer ridge 50, which forms an arcuate channel with the inner ridge may also be provided, as shown in FIGS. 3 and 4. Thus it will be seen that by virtue of the telescoping ends 32 and 34 of the insulator sections 26 and 28, and by virtue of the overlapping tabs on the arcuate flanges, the insulator members, when inserted in the slots in the core, completely isolate the windings of the coil 24 from the metal of the core stack.

Figure 7:
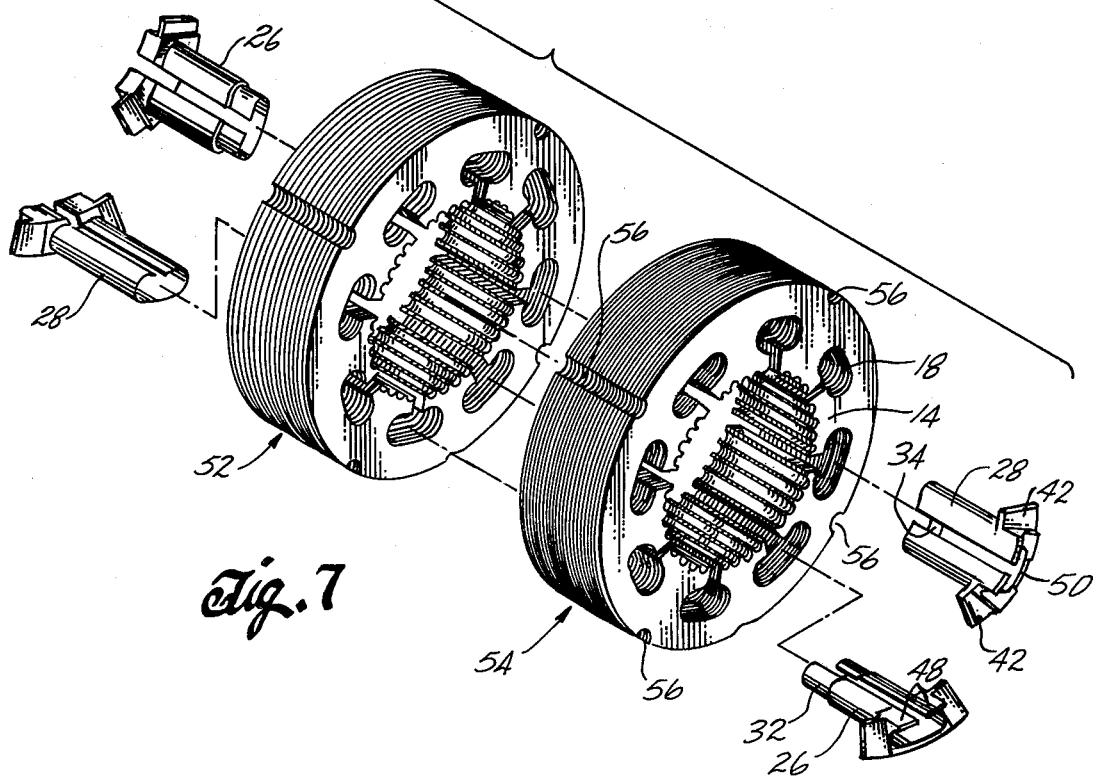
FIG. 7 is an exploded perspective view of the stator core showing the method of assembly.

Not only do the tubular insulator members provide improved electrical isolation between the windings and the stack, they also greatly simplify the assembly of the stack. The method of assembly can best be understood by reference to FIG. 7. The laminations are first arranged in two half-stacks, indicated at 52 and 54, with approximately equal number of laminations in each stack. The individual half-stacks may be assembled in separate fixtures which maintain the laminations in alignment using the key slots, such as indicated at 56, to hold the laminations in alignment. The female sections 28 of the tubular insulator members are then inserted in alternate slots of each of the half-stacks. Because the female sections are longer than half the length of the finished stator stack, the two half-stacks 52 and 54 can be assembled together by bringing the two halves together with the projecting telescoping ends of the female insulator sections of one half-stack fitting into the unoccupied slots of the other half-stack. Thus the two half-stacks are temporarily held in alignment while the assembly is completed by inserting the male sections 26 into the unoccupied slots from opposite ends of the assembled stack. The engaging telescoping ends of the male and female sections assist in maintaining the laminations together in a unitary stack structure while the coils are wound on the respective poles. The windings of course act to secure the laminated stacks firmly together, the inserted insulator members maintaining the laminations in accurate alignment.

An alternative embodiment is shown in FIGS. 8 and 9 which is particularly useful in the smaller size motors. In the modification of FIGS. 8 and 9, the tubular insulator members positioned in each slot of the core 12 are made of two substantially abutting sections, a short section 60 and a long section 62, which are inserted from opposite directions into each of the slots. The two tubular sections meet in substantially abutting relationship in the slot. The sections are molded with an outer flange or lip 64 which engages the end of the stack adjacent the slot. The flanged ends of adjacent tubular insulation members 20 substantially abut in the region between adjacent slots. The long sections 62 are made longer than half the thickness of a stack and are inserted from opposite directions in alternate slots. Thus the long sections in adjacent slots overlap relative to the center laminations of the stack. Thus frictional contact between the laminations and the long tubular sections 62 tends to hold the laminations in place until the windings are added. By having the sections meet in the slot in abutting relationship rather than in telescoping relationship, the insulation material can be made considerably thinner, thus providing larger openings through the tubular sections for the windings. This is particularly important in winding coils in the slots of very tiny motors where copper space is at a premium.

The insulation sections are split longitudinally so they can be compressed when inserted into the slots and allowed to expand again within the slots, in the same manner as the embodiment described in connection with FIGS. 1–7.

The method of assembly is identical to that described above in connection with FIG. 7 in that the longer sections 62 are inserted into alternate slots of two stack sections. Because the longer sections 62 are longer than half the thickness of the assembled stack, they will extend completely through and project from the opposite side of the divided stack, thus allowing the two halves of the stack to be held together by the overlapping of the long sections. After the stack is assembled with the long sections extending into alternate slots from opposite ends of the stack, the short sections 60 are inserted in the remaining open ends of the slots to form the stack assembly. The stack assembly is then wound in conventional manner. The slight gap between the abutting inner ends of the insulator sections are filled with insulation after the coils are wound and the assembly is dipped in a varnish or other suitable insulating coating material.

From the above description it will be seen that the molded tubular members simplify the assembly and provide an improved stator design. The molded insulator sections are easily inserted in the slots of the laminated core and operate to hold the laminations together by expanding and gripping the exposed edges of the laminations within the slots between the poles. The insulator members, being made of a tough plastic material, provide effective electrical isolation between the wire turns of the coils and the metal core of the stator. As a result, the use of the molded insulator members substantially reduces the time and cost of assembly of the motor stators and at the same time virtually eliminates defective stators resulting from poor electrical isolation between the wound coils and the stator core. The need to bond, weld, or otherwise secure the laminations together to form a unitary structure is eliminated by using the insulator members themselves to align and hold the laminations together during the winding operation.

What is claimed is:

1. A method of assembling a motor stator from a plurality of stamped sheet metal laminations having an outer circular rim and an even number of inwardly projecting poles separated by undercut slots joined by means of molded slotted tubular male and female insulator elements flanged at one end and having telescoping ends at the other end, comprising the steps of: forming two stacks of laminations, inserting the female insulator elements into alternate slots in each of the stacks, joining the two stacks together with the female insulator elements of one stack being inserted into the open slots of the other stack, and inserting male insulator elements from the opposite end of each of the slots from the female insulator members into telescoping engagement with the inserted ends of the female insulator elements.

2. The method of claim 1 further including the step of winding coils around the poles formed by the assembled two stacks of laminations, the turns of the coils passing through the openings in the slots formed by the telescopically joined male and female insulator elements.

3. A method of assembling a motor stator from a plurality of stamped sheet metal laminations having an outer circular rim and an even number of inwardly projecting poles separated by undercut slots comprising the steps of: forming two stacks of laminations, inserting a first set of tubular insulator elements into alternate slots in each of the stacks, the first set of insulator elements being longer than the length of the respective stacks, so that the inserted ends of the elements project beyond the other side of the stacks, joining the two stacks together by inserting the projecting ends of the insulator elements of one stack into the alternate open slots of the other stack to hold the two stacks together, and inserting insulator elements from the opposite end of each of the slots after the two stacks are joined.

4. The method of claim 3 further including the step of winding coils around the poles formed by the assembled two stacks of laminations, the turns of the coils passing through the openings in the slots formed by the insulator elements.

* * * * *